United States Patent [19]
Terrey

[11] 3,763,430
[45] Oct. 2, 1973

[54] CIRCUIT TESTING METHOD AND APPARATUS

[75] Inventor: Charles H. Terrey, Covina, Calif.

[73] Assignee: Burroughs Corporation, Detroit, Mich.

[22] Filed: Jan. 14, 1972

[21] Appl. No.: 217,859

Related U.S. Application Data

[63] Continuation of Ser. No. 17,413, March 9, 1970, abandoned.

[52] U.S. Cl. .................................. 324/73 R, 324/51
[51] Int. Cl. ............................................. G01r 15/12
[58] Field of Search .................. 314/51, 52, 66, 67, 314/73

[56] References Cited
UNITED STATES PATENTS

| | | | |
|---|---|---|---|
| 3,441,849 | 4/1969 | Bennet | 324/73 |
| 3,471,778 | 10/1969 | Bennet | 324/73 |
| 3,370,232 | 2/1968 | Wickersham | 324/73 |
| 3,492,571 | 1/1970 | Deslar | 324/73 |

OTHER PUBLICATIONS

Technical Manual, Operation And Maintenance Back--Plane Validation System, Pub. by DITMCO, pp. 1-1 to 1-4, 2-1 to 2-17, 3-1 to 3-6, 4-1 to 4-23, 5-1 to 5-23, Appendix I, Appendix II.

*Primary Examiner*—Michael J. Lynch
*Attorney*—Robert L. Parker et al.

[57] ABSTRACT

Method and apparatus for testing complexes of circuits, such as printed circuit boards and the like, for continuity of desired circuits and absence of short circuiting are provided. A circuit board having a plurality of possible circuit nodes has each node scanned sequentially by a step switch or the like. As each node is scanned in one embodiment, all lower order nodes are electrically interconnected, and means are provided for sensing closed circuit and open circuit signals between the scanned node and interconnected nodes. Logic is provided for "rejecting" a board if both the closed circuit sensing and open circuit sensing are either within or without acceptable limits and for "accepting" a board if either is within the limits when the other is without. Signals representative of the presence or absence of a circuit for each node as scanned is applied to a cyclic shift register having fewer bits than the number of circuit nodes. After all the nodes have been scanned, the final word in the cyclic shift register is compared with an input word for providing an output signal indicative of identity or lack of identity of the measured word and the comparison word. By sensing continuity between each circuit node sequentially while all lower order nodes are interconnected the lowest order node in each continuous circuit is identified, and an acceptable circuit can be distinguished from an unacceptable circuit without exploring each circuit path separately, thereby greatly reducing the circuit testing time.

24 Claims, 8 Drawing Figures

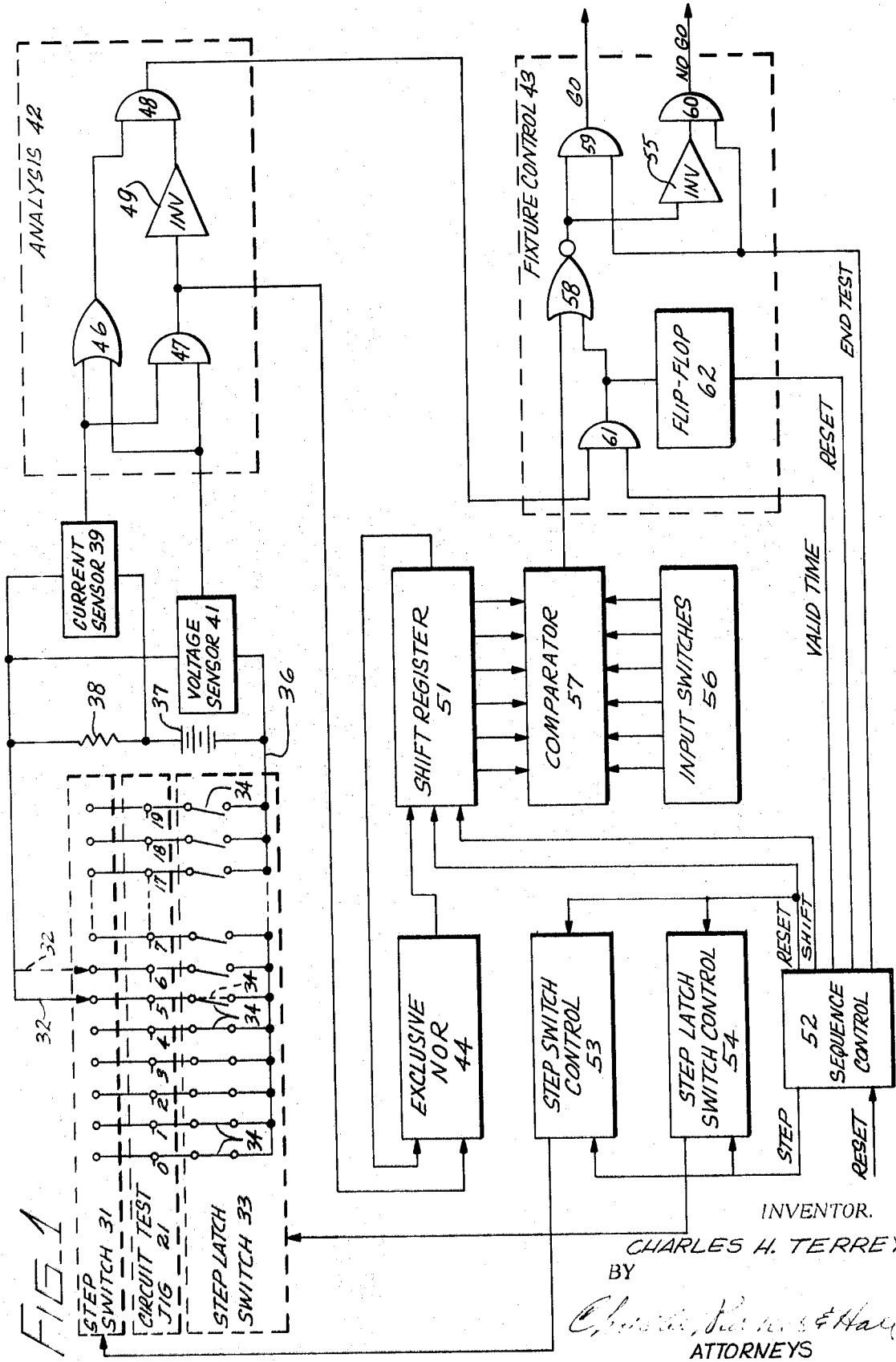

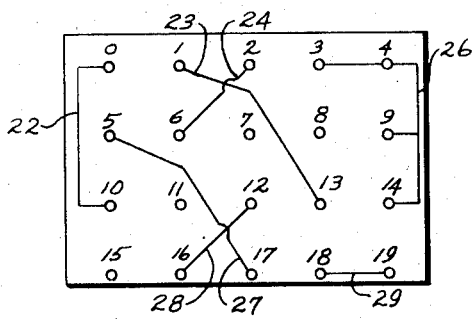
Fig_2
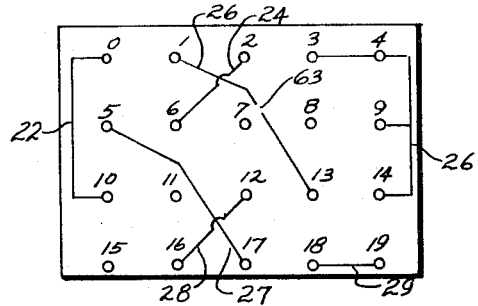
Fig_3
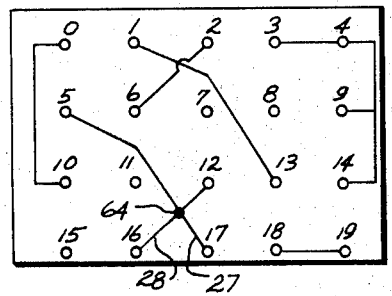
Fig_4
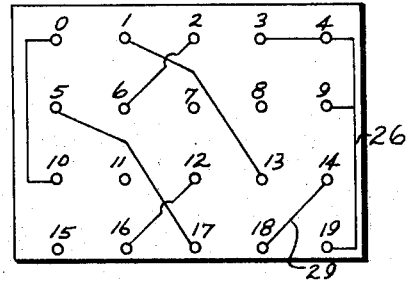
Fig_5
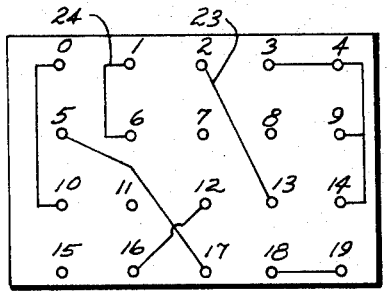
Fig_6
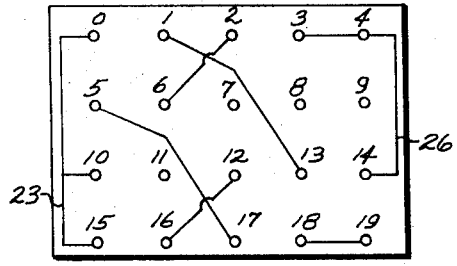
Fig_7
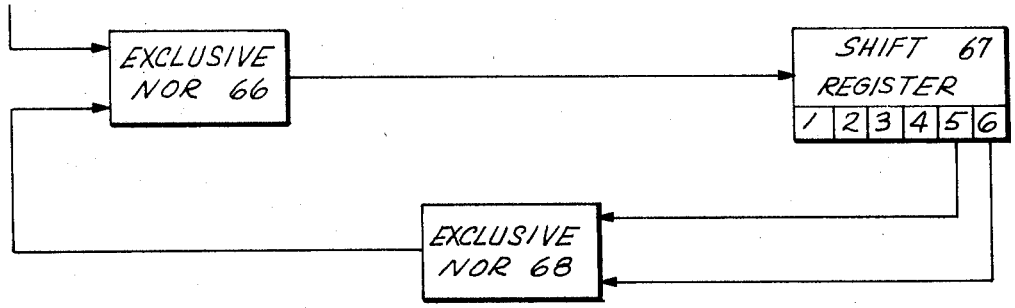
Fig_8

CIRCUIT TESTING METHOD AND APPARATUS

This is a continuation of my application Ser. No. 17,413, filed Mar. 9, 1970 now abandoned.

BACKGROUND

Many pieces of modern electronic equipment rely heavily on very large scale printed circuit boards or panels having pins interconnected in complex patterns by conductors of various types. Such boards are commonly used in computers and many other types of electronic equipment having complex circuitry. Such boards are fabricated with conductive paths, either in the form of circuits printed on the board or wiring between pins, prior to the installation of active circuit components on the board. After the printed circuit board is prepared, or the pin-type board is wired, it is desirable to check the circuits on the board to verify that all desired circuits have been made, that is, there are no open circuits, and also to verify that no unintentional circuits have been made, that is, short circuits. On a circuit board there are usually many circuits that prior to installation of active circuit components are not connected to the input and output leads of the board. There are, however, many points on the board to which electrical contact can be made, and these points can be considered as circuit nodes. Thus, for example, in a wired board each of the pins to which components are to be attached or sockets in which they are to be inserted provides a possible circuit node. On a printed circuit board, the circuit nodes are points at which circuit elements such as transistors, memory devices, resistors, connectors and the like are subsequently connected.

After a board has been manufactured, it is desirable to check and make sure that each circuit node is correctly connected to each circuit node to which it is supposed to be connected, and it is also desirable to verify the absence of unintentional connections. Such faults in a wired board can occur if, for example, wires are not properly connected to a pin to provide a good electrical contact, or if a wire is connected to the wrong pin, or if two wires are accidentally shorted together, or if a wire is broken. In a printed circuit board such faults can occur, for example, due to lack of plating within a plated-through hole, or due to the presence of a small conductive path between circuit paths due to a blemish in a photographic negative or a failure in an etching solution. It should be recognized that these are merely typical faults that may occur in a circuit board, and it is very difficult to identify such errors by manual inspection. Modern boards may involve hundreds or even thousands of circuit nodes, and manual testing is prohibitive.

Circuit testing apparatus have therefore been developed for checking the presence or absence of conductive paths between the several circuit nodes on a circuit board. The prior technique has been to check one circuit node against each of the other circuit nodes in turn and then individually check each other circuit node against all other circuit nodes on the board to trace down each possible circuit path. The circuit paths found in this manner are then compared with the desired circuit paths to verify the acceptability of the board. Such apparatus is suitable when there are a limited number of possible circuit nodes; however, in modern boards with hundreds or thousands of circuit nodes, the time required to scan the entire board becomes prohibitive. Some scanning patterns have involved factorial increases of number of steps with increasing number of pins, and the time is prohibitive in production processes where it is not uncommon to check hundreds of boards per day. Thus, for example, even when the scanning is conducted at a rate in the order of megacycles per second, a matter of minutes may be required to check out all the possible circuit paths on a large-scale board.

It is therefore desirable to provide a method and apparatus for verification of the circuits on a circuit board in a very short time interval.

BRIEF SUMMARY OF THE INVENTION

Therefore, in practice of this invention according to a preferred embodiment there is provided a circuit testing apparatus for testing a circuit having a plurality of nodes comprising means for sequentially applying a signal to one test node after another, and at the same time interconnecting all lower order circuit nodes and means for sensing the signal on the set of interconnected nodes. Signals indicative of the presence or absence of a circuit can be applied to means for generating a number having fewer bits than the number of circuit nodes. Means may also be provided for comparing the shorter number with a number representative of an acceptable circuit for passing or rejecting circuits under test. Multiple scans or different degrees of data compression can be employed for identifying unacceptable boards even in presence of certain rather rare circuit faults.

DRAWINGS

These and other features and advantages of the present invention will be appreciated as the same becomes better understood by reference to the following detailed description of a presently preferred embodiment when considered in connection with the accompanying drawings wherein:

FIG. 1 illustrates in block diagram a circuit testing apparatus constructed according to principles of this invention;

FIG. 2 illustrates a typical acceptable circuit board;

FIG. 3 illustrates a board like that of FIG. 2 with an unintentional open circuit;

FIG. 4 illustrates a board like that of FIG. 2 with an unintentional short circuit;

FIG. 5 illustrates a board like that of FIG. 2 having desired connections inadvertently interchanged;

FIG. 6 illustrates a board like that of FIG. 2 with a different pair of connections inadvertently interchanged;

FIG. 7 illustrates a board like that of FIG. 2 having an open circuit and a short circuit; and FIG. 8 illustrates in block form a fragment of circuit testing apparatus for detecting certain circuit faults of the sort illustrated in FIGS. 3 to 7.

DESCRIPTION

FIG. 1 illustrates in block diagram form a circuit testing apparatus constructed according to principles of this invention. In this preferred embodiment, a circuit testing jig 21 is employed for making electrical connections to a circuit board such as that illustrated schematically in FIG. 2. The circuit test jig 21 is a conventional item presently employed with circuit testing apparatus and merely provides a fixture for holding the board and making electrical contact to selected points on the board, depending on the arrangement of contactors on the jig. It is, in effect, merely a connector between a circuit board or the like and the circuit testing apparatus. As described in the preferred embodiment, testing is conducted on a wired board having pins; however, it should be apparent that the same principles are equally applicable to a printed circuit board or other element having conductive circuits and any suitable test jig can be employed for interconnecting such a circuit element with the circuit testing apparatus.

FIG. 2 illustrates a typical wired circuit board having a rectangular matrix of pins numbered 0 to 19 in the illustrated embodiment. It will, of course, be recognized that a board having only 20 pins in a 4 × 5 rectangular matrix is actually extremely simple as compared with the presently used boards having hundreds or thousands of pins; however, the principles are equally applicable to any number of pins, and 20 is sufficient for illustrating principles of this invention. The circuits illustrated on the board of FIG. 2 are also relatively simple, however, they also are sufficient to illustrate principles of this invention.

In a wired circuit board, electrically conductive wires are connected between pins for forming conductive paths prior to installation of active circuit components on the board. Thus, in the illustrated embodiment, a wire 22 interconnects pins 0 and 10. Another wire 23 interconnects pins 1 and 13. A third wire 24 interconnects pins 2 and 6. Another wire 26 is connected to pins 3, 4, 9 and 14 so that these four pins are all electrically interconnected. An additional wire 27 interconnects pins 5 and 17. Another wire 28 interconnects pins 12 and 16, and a final wire 29 interconnects pins 18 and 19.

Each of the pins 0 to 19 comprises a circuit node to which electrical contact is made by the circuit test jig 21. In a circuit board it may occur that not all of the pins are interconnected, and often there will be pins such as, for example, pins 7 and 8 to which no wire is connected. As a matter of convenience in nomenclature, the first pin in each complete circuit when scanned in a particular sequence is referred to as the lowest order node. Thus, for example when scanned in numerical order, pin 0 is the lowest order node in the circuit including pin 0, wire 22, and pin 10. Likewise, pin 3 is the lowest order node in the circuit including pins 3, 4, 9 and 14, and wire 26. Although described herein in terms of lower order nodes, it will become apparent that higher order nodes could equally well be employed.

In practice of the method provided by this invention, all of the nodes on the circuit board being tested are scanned in a selected sequence with a forcing voltage. All circuit nodes of a lower order than the node being forced at any instant are electrically interconnected, that is, all are in parallel. The relationship of open circuit or short circuit is determined for each node being forced to all lower order nodes collectively. This identifies all of the lowest order nodes in each of the continuous circuits on the board. As pointed out hereinafter the pattern of lowest order nodes is sufficient to distinguish an acceptable board from an unacceptable one.

In order to practice this portion of the method, a step switch 31, is connected to the several leads of the circuit test jig 21 so that electrical contact can be made by a contactor 32 with each node of the circuit sequentially. A step latch switch 33 is also connected to the several leads of the circuit test jig 21, and as the contactor 32 steps along the sequence of circuit nodes latching switches 34 between the circuit test jig and a common bus 36 are sequentially closed.

Thus, for example, in the illustrative embodiment of FIG. 1, the contactor 32 of the step switch 31 is in electrical contact with circuit node 5. The switches 34 connected to the lower order nodes 0 to 4 are all closed so that these lower order nodes are all electrically interconnected to the bus 36. The switch 34 associated with the circuit node 5 and all higher nodes 6 to 19 are open so that these nodes are not connected to the common bus 36. When the contactor 32 advances in sequence to electrical contact with circuit node 6 as illustrated in phantom in FIG. 1, the switch 34 associated with circuit node 5 closes, also as shown in phantom, since circuit node 5 is now a lower order node relative to node 6.

In the illustrated embodiment, the step switch 31 and step latch switch 33 are indicated schematically and may, for example, be rotary step switches such as are readily commercially available. When the number of pins or circuit nodes is high, and it is possible to identify these pins with a rectangular matrix such as the 4 × 5 array of FIG. 2, it is preferred to employ conventional crossbar switches as the step switch 31 and step latch switch 33. Reed-type crossbar switches are available having switching times in the order of 1 millisecond in response to an $x$ and $y$ address applied to the switch. This permits sufficiently rapid testing of large-scale boards with the entire testing sequence as provided in practice of this invention being completed in only a few seconds at the very most. If desired, solid state switching instead of mechanical crossbars switches can be employed for even higher testing rates, which may be desirable if there are several thousand circuit nodes and more than one scan sequence is employed, such as set out hereinafter.

A power supply 37 is connected between the contractor 32 and the common bus 36 for applying a forcing voltage to the circuit node to which the contactor is in electrical contact. A resistance 38 between the power supply 37 and the contactor provides a voltage drop for sensing by a current sensor 39. A voltage sensor 41 is also provided between the contactor 32 and the bus 36 for measuring the voltage thereacross.

The current sensor 39 monitors the leakage current between the contactor 32 and the lower order circuit nodes connected to the common bus 36. Preferably, the current sensor is adjustable to provide a logical 0 output signal if the insulation or resistance of the circuit is greater than an acceptable limit for an open circuit, and a logical 1 if the insulation is less than the limit acceptable for an open circuit. Thus, if there exists a good conductive path through the tested circuit on the circuit board being tested, the current sensor provides a 1 output signal. The detection limit is adjustable so that a 1 signal is obtained if there exists a moderate resistance conductive path such as, for example, might occur through a tiny sliver of metal between intentional conductors on a printed circuit board.

The voltage sensor 41 monitors the conductivity of the path between the contactor 32 and the interconnected lower order circuit nodes connected to the common bus 36. Preferably, the voltage sensor 41 is adjustable to provide a logical 1 output if the conductivity is sufficiently high for an acceptable circuit path and to provide a logical 0 signal for an unacceptable or open circuit, that is, when there is no electrical circuit path or a very poor one between the contactor connected node and the interconnected lower order nodes.

The current sensor 39 and voltage sensor 41 may each merely be a conventional comparator providing a binary digital ouput in response to comparison of two voltages. It is convenient to provide an adjustable comparison voltage directly from the power supply 37 so that these sensors are self compensating.

The output signals from the current sensor 39 and voltage sensor 41 are applied to analysis logic 42, which, under some conditions, produces a rejection signal that is applied directly to fixture control logic 43. The analysis logic 42 also produces a circuit status signal that is applied to an exclusive NOR gate 44. The analysis logic produces a logical 0 on the signal line to the fixture control logic 43 if either the conductivity or leakage is within acceptable limits, and produces a logical 1 if both the leakage and the conductivity are acceptable or not acceptable. The analysis logic provides a logical 1 output if there is an acceptable conductive path and a logical 0 if the circuit path is open, both of these signals being applied as input to the exclusive NOR gate 44.

Within the analysis logic 42 the output signals from both the current sensor 39 and voltage sensor 41 are applied to an OR gate 46 and to an AND gate 47. The output of the OR gate 46 is in turn applied as an input to a second AND gate 48. The other input to the second AND gate 48 is the output of an inerter 49 having as its input the output of the first AND gate 47. If both the current sensor 39 and voltage sensor 41 have logical 1 output, the output of the AND gate 47 is true, or 1, and because of the inverter 49, a logical 0 signal is applied to the second AND gate 48. The output of that gate is, therefore, also a 0 for application to the fixture control logic 43. Such signals are obtained from the current sensor and voltage sensor when there is a closed circuit from the node being forced to the interconnected nodes. If both the current sensor 39 and voltage sensor 41 have 0 outputs, as is the case when there is an open circuit, the output of the OR gate 46 is false, and hence the output of the second AND gate 48 is also false or 0. On the other hand, if either the current sensor 39 or voltage sensor 41 has a logical 1 output and the other has a logical 0 output, as can be the case if there is a high resistance short or a poor contact, for example, the output of the OR gate 46 is true and the first AND gate 47 is false. Because of the inverter 49, the two inputs to the second AND gate 48 are true, thereby producing a true or logical 1 signal at its output for application to the fixture control logic 43.

It should be noted that the simultaneous checking of conductivity and insulation of a possible conductive path is also useful in the prior testing technique wherein each node is contacted and a search made for all nodes connected thereto. This provides sensing of high resistance paths between nodes which are either too low to represent satisfactory insulation or too high to represent a satisfactory conductor. When such a path is found, no matter what scan is employed, the board can be summarily rejected or remedial action taken.

As pointed out hereinabove, when both the current sensor 39 and voltage sensor 41 have true outputs indicating a closed circuit, the output of the first AND gate 47 is also true or 1, and this signal is applied to the exclusive NOR gate 44. In any other case, the ouput of the first AND gate 47 is false and 0 for application to the exclusive NOR gate. The output of the exclusive NOR gate 44 is applied to a conventional six bit shift register 51. The signal in the sixth or last bit of the shift register 51 is also applied to the exclusive NOR gate 44 to form a cyclic shift register. It might be noted that either an exclusive NOR gate or an exclusive OR gate can be employed in a properly designed cyclic shift register. The output of the exclusive NOR gate 44, and hence the input to the shift register 51, is 1 if both inputs thereto are either 1 or 0. If the two inputs to the exclusive NOR gate are 1 and 0, or 0 and 1, the NOR gate output is 0.

A sequence controller 52 provides a reset signal to the shift register 51 so that at the beginning of a test cycle, the shift register is filled with 0's. The sequence control also provides a shift signal to the shift register for proper timing of the shift in correlation with the incoming train of signals from the analysis logic 42. The reset signal is also applied to a step switch control 53 and a step latch switch control 54. The sequence control also applies a step signal to the two stepping switch controls 53 and 54 for timing the stepping of the switches 31 and 33. The step switch control 53 and step latch switch control 54 provide signals for sequentially stepping the two switches, or if crossbar switches are employed, the switch controls 53 and 54 provide $x$ and $y$ address signals.

Input switches 56, which in the illustrated embodiment are merely manual switches, provide six inputs to a conventional comparator 57. Another six inputs to the comparator 57 come from the six bits of the shift register 51. The comparator provides a logical 0 output signal when the six bit binary number or "word" in the shift register is identical to the binary number or "word" recorded in the input switches 56, and provides a logical 1 output signal when there is any difference between the words in the shift register and input switches. Preferably, the input switches 56, in the illustrated embodiment, are a pair of manual switches having three bit binary outputs and calibrated at the input in an octal code from 0 to 7. It is found that an octal code of but two digits is more readily understood by an operator than a six bit binary code, and it is, therefore, a convenient input arrangement. It should also be apparent that a shift register considerably longer than six bits may be employed, if desired, thereby calling for more that two octal input switches. It will also be apparent that other input switching arrangements can be employed, either manually or automatically, if desired.

The output of the comparator 57 is applied by way of a NOR gate 58 to a pair of final AND gates 59 and 60. The other input to the NOR gate 58 is the output of an AND gate 61 having as one of its inputs the rejection or acceptance signal from the final AND gate 48 in the analysis logic 42. The other input to the AND gate 61 is a "valid time" signal from the sequence control 52 having a 1 input when the circuit condition is to be tested, and a 0 signal when the circuit condition should not be tested, such as, for example, during the interval that the step switches are stepping. This merely serves as a gate to bar spurious signals.

The other input to the final AND gate 59 is an end test signal from the sequence control 52 which indicates that the circuit testing sequence has been completed, and when both the end of test signal and NOR gate output are true, a logical 1 or GO signal is provided on the output line, indicating that the circuit board under test is acceptable. The output of the NOR gate 58 is applied to the final AND gate 60 through an inverter 55. The other AND gate input is the end of test sequence signal. When the NOR gate output is a logical 1, the inverter assures that the AND gate output is false. When the NOR gate output is false or 0, the final AND gate 60 is true and a NO GO signal appears on the output line, indicating that the circuit board under test should be rejected.

It will be recalled that a logical 1 rejection signal from the analysis logic 42 can appear at the AND gate 61 at any node as they are sequentially scanned. The GO and NO GO signals from the final AND gates 59 and 60 are provided, however, only at the end of the complete testing sequence. It is, therefore, in this arrangement, necessary to store any reject signal occurring during the sequence until the end of the cycle. A flip-flop 62 is, therefore, provided connected to the output of the AND gate 61 so that the flip-flop is set if a reject signal should occur at any valid time during the scanning sequence. Thus, at the end of the test, if there has been a rejection signal from the analysis logic 42, there is a logical 1 stored in the flip-flop 62 which is applied as an input to the NOR gate 58. If a reject signal or 1 appears on either the flip-flop 62 or the comparator 57 output at the end of the test, the output of the NOR gate 58 is 0 and a NO GO signal is provided at the output. In the illustrated embodiment, the output lines merely provide an output signal, and it will be apparent that many uses can be made of such a signal, such as, indicating to an operator that the board should be accepted or rejected, or if preferred automatic sorting equipment can be employed for directing acceptable boards to one location and unacceptable boards to a different location.

OPERATION

The scanning sequence employed across the circuit nodes can be quite varied; however, for purposes of exposition, it will be assumed in a first example that the scan commences at circuit node 0 and continues sequentially in increasing numerical order. In the first step the contactor is at node 0 and all the switches 34 are open so that there is always a logical 0 output from the analysis logic to the input of the NOR gate 44. In the second position, the contactor 32 is in contact with circuit node 1, and the appropriate switch 34 is closed so that circuit node 0 is connected to the common bus 36. In the circuit board illustrated in FIG. 2, there is no electrical connection between pins 0 and 1 and, therefore, a logical 0 is produced by the analysis logic 42 as hereinabove described. At the next step, the contactor 32 (FIG. 1) is in contact with circuit node 2, and the switches corresponding to circuit nodes 0 and 1 are closed, thereby electrically interconnecting these lower order circuit nodes.

The following table sets forth the logical data obtained during a scan sequence of the board of FIG. 2 and other boards illustrated hereafter:

TABLE

| Fig./Scan | NODE | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|---|
| 2/A | Raw Data | 0 | 0 | 0 | 0 | 1 | 0 | 1 | 0 | 0 | 1 | 1 | 0 | 0 | 1 | 1 | 0 | 1 | 1 | 0 | 1 |
| 2/A | Sixth Bit | 0 | 0 | 0 | 0 | 0 | 0 | 1 | 1 | 1 | 1 | 0 | 1 | 1 | 0 | 0 | 1 | 0 | 0 | 0 | 0 |
| 2/A | Register Input | 1 | 1 | 1 | 1 | 0 | 1 | 1 | 0 | 0 | 1 | 0 | 0 | 0 | 0 | 0 | 0 | 0 | 0 | 1 | 0 |
| 2/A |  |  |  |  |  |  |  |  |  |  |  |  |  |  |  |  | Octal Code 02 | | | | |
| 3/A | Raw Data | 0 | 0 | 0 | 0 | 1 | 0 | 1 | 0 | 0 | 1 | 1 | 0 | 0 | 0 | 1 | 0 | 1 | 1 | 0 | 1 |
| 3/A | Sixth Bit | 0 | 0 | 0 | 0 | 0 | 0 | 1 | 1 | 1 | 1 | 0 | 1 | 1 | 0 | 0 | 1 | 0 | 0 | 0 | 1 |
| 3/A | Register Input | 1 | 1 | 1 | 1 | 0 | 1 | 1 | 0 | 0 | 1 | 0 | 0 | 0 | 1 | 0 | 0 | 0 | 0 | 1 | 1 |
| 3/A |  |  |  |  |  |  |  |  |  |  |  |  |  |  |  |  | Octal Code 03 | | | | |
| 4/A | Raw Data | 0 | 0 | 0 | 0 | 1 | 0 | 1 | 0 | 0 | 1 | 0 | 1 | 1 | 1 | 0 | 1 | 1 | 0 | 1 | |
| 4/A | Sixth Bit | 0 | 0 | 0 | 0 | 0 | 0 | 1 | 1 | 1 | 1 | 0 | 1 | 1 | 0 | 0 | 1 | 0 | 0 | 1 | 0 |
| 4/A | Register Input | 1 | 1 | 1 | 1 | 0 | 1 | 1 | 0 | 0 | 1 | 0 | 0 | 1 | 0 | 0 | 0 | 0 | 0 | 0 | 0 |
| 4/A |  |  |  |  |  |  |  |  |  |  |  |  |  |  |  |  | Octal Code 00 | | | | |
| 5/A | Raw Data | 0 | 0 | 0 | 0 | 1 | 0 | 1 | 0 | 0 | 1 | 1 | 0 | 0 | 1 | 0 | 0 | 1 | 1 | 1 | 0 |
| 5/A | Sixth Bit | 0 | 0 | 0 | 0 | 0 | 0 | 1 | 1 | 1 | 1 | 0 | 1 | 1 | 0 | 0 | 1 | 0 | 0 | 0 | 0 |
| 5/A | Register Input | 1 | 1 | 1 | 1 | 0 | 1 | 1 | 0 | 0 | 1 | 0 | 0 | 0 | 0 | 0 | 1 | 0 | 0 | 0 | 1 |
| 5/A |  |  |  |  |  |  |  |  |  |  |  |  |  |  |  |  | Octal Code 41 | | | | |

| | | | | | | | | | | | | | | | | | | | | | |
|---|---|---|---|---|---|---|---|---|---|---|---|---|---|---|---|---|---|---|---|---|---|
| 6/A | Raw Data | 0 | 0 | 0 | 0 | 1 | 0 | 1 | 0 | 0 | 1 | 1 | 0 | 0 | 1 | 1 | 0 | 1 | 1 | 0 | 1 |
| 6/A | Sixth Bit | 0 | 0 | 0 | 0 | 0 | 0 | 1 | 1 | 1 | 1 | 0 | 1 | 1 | 0 | 0 | 1 | 0 | 0 | 0 | 0 |
| 6/A | Register Input | 1 | 1 | 1 | 1 | 0 | 1 | 1 | 0 | 0 | 1 | 0 | 0 | 0 | 0 | 0 | <u>0</u> | <u>0</u> | <u>0</u> | <u>0</u> | <u>1</u> | <u>0</u> |
| 6/A | | | | | | | | | | | | | | | | | | Octal Code 02 | | | | |

| NODE | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|
| 2/B Raw Data | 0 | 1 | 0 | 0 | 0 | 0 | 0 | 1 | 0 | 0 | 1 | 0 | 0 | 0 | 1 | 1 | 1 | 1 | 1 | 1 |
| 2/B Sixth Bit | 0 | 0 | 0 | 0 | 0 | 0 | 1 | 0 | 1 | 1 | 1 | 1 | 0 | 0 | 0 | 0 | 1 | 0 | 1 | 1 |
| 2/B Register Input | 1 | 0 | 1 | 1 | 1 | 1 | 0 | 0 | 0 | 0 | 1 | 0 | 1 | 1 | <u>0</u> | <u>0</u> | <u>1</u> | <u>0</u> | <u>1</u> | <u>1</u> |
| 2/B | | | | | | | | | | | | | | | | Octal Code 13 | | | | | |
| 6/B Raw Data | 0 | 1 | 0 | 0 | 0 | 0 | 0 | 1 | 0 | 0 | 1 | 0 | 0 | 0 | 1 | 1 | 1 | 1 | 1 | 1 |
| 6/B Sixth Bit | 0 | 0 | 0 | 0 | 0 | 0 | 1 | 0 | 1 | 1 | 1 | 1 | 0 | 0 | 0 | 0 | 1 | 0 | 1 | 1 |
| 6/B Register Input | 1 | 0 | 1 | 1 | 1 | 1 | 0 | 0 | 0 | 0 | 1 | 0 | 1 | 1 | <u>0</u> | <u>0</u> | <u>1</u> | <u>0</u> | <u>1</u> | <u>1</u> |
| 6/B | | | | | | | | | | | | | | | | Octal Code 13 | | | | | |

Fig./Scan

| NODE | 0 | 5 | 10 | 15 | 1 | 6 | 11 | 16 | 2 | 7 | 12 | 17 | 3 | 8 | 13 | 18 | 4 | 9 | 14 | 19 |
|---|---|---|---|---|---|---|---|---|---|---|---|---|---|---|---|---|---|---|---|---|
| 2/C Raw Data | 0 | 0 | 1 | 0 | 0 | 0 | 0 | 0 | 1 | 0 | 1 | 1 | 0 | 0 | 1 | 0 | 1 | 1 | 1 | 1 |
| 2/C Sixth Bit | 0 | 0 | 0 | 0 | 0 | 0 | 1 | 1 | 0 | 1 | 1 | 1 | 0 | 0 | 0 | 0 | 1 | 1 | 1 | 1 |
| 2/C Register Input | 1 | 1 | 0 | 1 | 1 | 1 | 0 | 0 | 0 | 1 | 1 | 1 | 1 | <u>0</u> | <u>1</u> | <u>1</u> | <u>1</u> | <u>1</u> | <u>1</u> | |
| 2/C | | | | | | | | | | | | | | | Octal Code 37 | | | | | | |
| 6/C Raw Data | 0 | 0 | 1 | 0 | 0 | <u>1</u> | 0 | <u>1</u> | 0 | 0 | 1 | 1 | 0 | 0 | 1 | 0 | 1 | 1 | 1 | 1 |
| 6/C Sixth Bit | 0 | 0 | 0 | 0 | 0 | 0 | 1 | 1 | 0 | 1 | 1 | 0 | 0 | 1 | 1 | 0 | 1 | 0 | 1 | 0 |
| 6/C Register Input | 1 | 1 | 0 | 1 | 1 | 0 | 0 | 1 | 1 | 0 | 1 | 0 | 1 | 0 | <u>1</u> | <u>1</u> | <u>1</u> | <u>0</u> | <u>1</u> | <u>0</u> |
| 6/C | | | | | | | | | | | | | | | Octal Code 72 | | | | | | |

| NODE | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 7/A Raw Data | 0 | 0 | 0 | 0 | 1 | 0 | 1 | 0 | 0 | <u>0</u> | 1 | 0 | 0 | 1 | 1 | <u>1</u> | 1 | 1 | 0 | 1 |
| 7/A Sixth Bit | 0 | 0 | 0 | 0 | 0 | 0 | 1 | 1 | 1 | 1 | 0 | 1 | 1 | 0 | 0 | 0 | 0 | 0 | 0 | 0 |
| 7/A Register Input | 1 | 1 | 1 | 1 | 0 | 1 | 1 | 0 | 0 | 0 | 0 | 0 | 0 | 0 | <u>0</u> | <u>0</u> | <u>0</u> | <u>0</u> | <u>1</u> | <u>0</u> |
| 7/A | | | | | | | | | | | | | | | | | | Octal Code 02 | | | |
| 2/D Raw Data | 0 | 0 | 0 | 0 | 1 | 0 | 1 | 0 | 0 | 1 | 1 | 0 | 0 | 1 | 1 | 0 | 1 | 1 | 0 | 1 |
| 2/D Fifth Bit | 0 | 0 | 0 | 0 | 0 | 1 | 1 | 1 | 1 | 0 | 0 | 1 | 0 | 0 | 0 | 0 | 0 | 1 | 0 | 0 |
| 2/D Register Input | 1 | 1 | 1 | 1 | 0 | 0 | 1 | 0 | 0 | 0 | 0 | 0 | 1 | 0 | <u>0</u> | <u>1</u> | <u>0</u> | <u>1</u> | <u>1</u> | <u>0</u> |
| 2/D | | | | | | | | | | | | | | | | | | Octal Code 26 | | | |
| 7/B Raw Data | 0 | 0 | 0 | 0 | 1 | 0 | 1 | 0 | 0 | <u>0</u> | 1 | 0 | 0 | 1 | 1 | <u>1</u> | 1 | 1 | 0 | 1 |
| 7/B Fifth Bit | 0 | 0 | 0 | 0 | 0 | 1 | 1 | 1 | 1 | 0 | 0 | 1 | 0 | 0 | 1 | 0 | 0 | 1 | 0 | 1 |
| 7/B Register Input | 1 | 1 | 1 | 1 | 0 | 0 | 1 | 0 | 0 | 1 | 0 | 0 | 1 | 0 | <u>1</u> | <u>0</u> | <u>0</u> | <u>1</u> | <u>1</u> | <u>1</u> |
| 7/B | | | | | | | | | | | | | | | | | | Octal Code 47 | | | |

In this table, the column headings labeled "Node" indicate the node with which the contactor 32 is connected at each step in the sequence. The first line in each set labeled "Raw Data" indicates the output of the analysis logic 42 to the exclusive NOR gate 44 at each step in the scanning sequence, it being recalled that a 0 in the Raw Data indicates an open circuit and a 1 indicates a closed circuit. The sets of data in the Table are numbered in correlation with the Figure number the scans represent.

As the contactor 32 (FIG. 1) scans the circuit nodes of the circuit board illustrated in FIG. 2 there is no electrical interconnection between nodes 0, 1, 2, and 3, and, therefore, logical 0's are recorded in the Raw Data line of the Table at each of these points. Thus, for example, when the contactor 32 is at circuit node 3, circuit nodes 0, 1, and 2 are all connected to the common bus 36; however, there is still no conductive path, and there is a 0 entered in the Table.

When the contactor is at circuit node 4, the switch 34 for circuit node 3 is closed, and there is now a conductive path from the contactor 32 through circuit node 4, the wire 26, and circuit node 3 to the common bus 36. There is, therefore, a logical 1 signal applied to the exclusive NOR gate 44 as indicated by the 1 at node 4 in the Raw Data line of the Table. When the contactor proceeds to node 5, the lower order circuit nodes 0, 1, 2, 3, and 4 are all connected to the common bus 36; however, there is no closed circuit between the circuit node 5 and any of the lower order nodes, and, therefore, a logical 0 is entered in the Raw Data line of the Table. When the contactor is in electrical contact with circuit node 6, all the lower order nodes 0, 1, 2, 3, 4, and 5 are connected to the common bus 36. In this circumstance, there is an electrical connection between the circuit node 6 and the common bus 36 by way of the wire 24 to pin 2, and, therefore, a logical 1 appears in the first Raw Data line of the Table. As scanning proceeds, the switches 34 associated with successive circuit nodes are closed, and logical 0's and 1's are provided sequentially to the exclusive NOR gate 44 in a pattern indicated as Raw Data.

Initially, the shift register 51 has all six bits filled with 0's, and the sixth bit is applied as an input to the exclusive NOR gate 44. At circuit node 0, the Raw Data is 0, and the sixth bit in the register is 0, and, therefore, the output of the exclusive NOR gate is a 1, which is entered in the first bit of the shift register (it will be recalled that the output of the exclusive NOR gate 44 is a logical 1 if the input bits are alike, and a logical 0 if the input bits are different). Thus, as seen in the scan of FIG. 2 in the Table, the first six bits of Raw Data are 000010, and the NOR gate output or register input is 111101.

When the contactor is at circuit node 6, there is a closed circuit as indicated by the 1 in the Raw Data line. By this time the first bit inserted into the shift register, a 1, has been shifted to the sixth place in the register and is applied to the exclusive NOR gate 44 at the same time as the Raw Data signal. Since these two signals in this example are the same, a 1 is entered in the register as indicated in the Register Input for the number 6 node in the Table. The Register Input at node No. 6 is, therefore, a composite of the raw data from node 0 and node 6. Similarly, when node 7 is tested, an open circuit is found as indicated by the 0 in the Raw Data line. The last bit from the shift register now corresponds to the second bit inserted, that is, from node 1, and is a logical 1. Since the Raw Data signal and Sixth Bit signal are different, a logical 0 is the NOR gate output and register input.

This cyclic shift of the contents of the register from the last bit to the first bit is continued as the scan proceeds with the composite of inputs accumulating until the effect of all the raw data is included in the shift register. Thus, for example, at node 12, the final bit of the register is a composite of the raw data at circuit node 0 and circuit node 6, and, therefore, the register input is a composite of the raw data at circuit nodes 0, 6, and 12. By continually cycling the data in the cyclic shift register, the six bits recorded therein at the end of an entire sequence is influenced by all the preceeding bits of raw data. If the scan is repeated, the final recorded data in the register will be identical each time. Thus, in the six bit register employed in the illustrative embodiment, at the end of a complete scan sequence there is a six bit binary word in the six places of the register, as indicated by the six underlined bits at the end of the register input line. As mentioned hereinabove, it is convenient to convert these six bits to two numerals in an octal code for operator convenience. The octal number representative of the circuit pattern illustrated in FIG. 2 is 02.

Since the word in the shift register at the end of the scan sequence is the same if the sequence is repeated, it follows that if a binary word or its octal equivalent is found for an acceptable circuit board, another acceptable circuit board tested in the same sequence will have the same code word and may be acceptable. It also turns out that if there is a single error in a board, either a short circuit or open circuit, a different word is invariably contained in the shift register at the end of the scan sequence, and such a board can be rejected.

FIG. 3 illustrates a printed circuit board having the same wiring connection as the board illustrated in FIG. 2 except that wire 23 between circuit nodes 1 and 13 is broken at point 63, thereby producing an inadvertent open circuit where there should be a circuit. A scan of the circuit nodes sequentially in increasing numerical order with all lower order circuit nodes electrically interconnected to the common bus 36 (FIG. 1) produces a train of raw data as indicated at raw data line 3/A. Up through circuit node 12, the raw data is the same as in the scan of the board illustrated in FIG. 2 since the connections from each node in sequence to lower order nodes are all the same. When circuit node 13 is scanned on the board illustrated in FIG. 3, there is no connection between node 13 and the lower order interconnected nodes 0 through 12 and, therefore, a logical 0 appears in the Raw Data for this scan instead of the logical 1 that appeared when the circuit board of FIG. 2 was scanned. (In each instance in the Table the bit that is different from the corresponding bit in the scan with which it is compared is underlined.) The presence of a logical 0 instead of a logical 1 causes a 1 rather than a 0 to be entered in the shift register at this point. This bit is carried through the shift register and is combined with the raw data for circuit node 19 which is a logical 1 in the Raw Data line so that a logical 1 is entered in the shift register instead of the logical 0 entered when the board illustrated in FIG. 2 was scanned. The final six bit word in the register is equivalent to 03 in octal code which is different from the 02 found for the acceptable board not having an open circuit. Since the octal number is different, the board illustrated in FIG. 3 is found to be different from the board illustrated in FIG. 2 and can therefore be considered to be unacceptable.

In operation of the apparatus illustrated in FIG. 1 the manual switches 56 are set to the octal number 02 when a circuit board is to be tested. When the acceptable board illustrated in FIG. 2 is tested according to the sequential scan, the six bits in the shift register are identical to the six bit code corresponding to the octal number 02, and the board is accepted. When the defective board illustrated in FIG. 3 is tested, the six bit binary word in the register is different from the manual switch setting and therefore the board is rejected.

FIG. 4 illustrates a circuit board wired like that in FIG. 2 except that wires 27 and 28 are shorted together at point 64 where they cross. A sequential scan of the nodes of the board illustrated in FIG. 4 yields a sequence of Raw Data as set forth in scan 4/A of the Table. This string of data is different from the scan obtained from the board illustrated in FIG. 2 by the presence of an extra closed circuit as indicated by the logical 1 corresponding to circuit node 12 which is now shorted to lower order node 5 by wires 28 and 27, whereas it was previously open to all lower order nodes. This information is cycled through the cyclic shift register in the same manner and the resultant octal number at the end of the entire scan sequence is 00, which is different from the octal number 02 resulting from a scan of the acceptable board of FIG. 2 and, therefore, the board illustrated in FIG. 4 is rejected.

FIG. 5 illustrates another possible fault that may occur in a circuit board, particularly a wired board. In the board illustrated in FIG. 5 the connections of the wires 26 and 29 are interchanged so that wire 26 instead of being connected to circuit pin 14 is connected to pin 19, and wire 29 instead of interconnecting pins 18 and 19, interconnects pins 18 and 14. The Raw Data scan 5/A in the Table shows the sequence of open and closed circuits found as each node is scanned sequentially with all lower order nodes interconnected. Because of the interchanged connections, the Raw Data for circuit nodes 14, 18 and 19 are changed, thereby effecting a change in the six bit word stored in the register at the end of the scanned sequence. This word corresponds to an octal number 41 which is different from the octal number 02 corresponding to the acceptable board illustrated in FIG. 2 and, therefore, the board illustrated in FIG. 5 can be rejected.

It turns out that if there is a single fault, and only a single fault, on a circuit board, the described technique and apparatus will invariably produce an octal number different from the octal number representing an acceptable board. There are circumstances, however, where a double fault may occur in a board in such a manner or location that the effect of the one fault exactly compensates for the effect of the other fault due to either an equivalent electrical interconnection on the board or due to the technique of accumulating the raw data in the cyclic shift register.

FIG. 6 illustrates a double fault that causes no change in the Raw Data of the scan as compared with FIG. 2 since the lowest order node in each complete circuit on the board is not changed. Thus, as illustrated in FIG. 6 wire 23 is connected between pins 2 and 13 instead of between 1 and 13 as in the board of FIG. 2, and wire 24 is connected between pins 1 and 6 instead of between pins 2 and 6 in the acceptable board. Such a pair of faults occurs if the wires leading to pins 1 and 2 are interchanged. Upon scanning the board illustrated in FIG. 6 in increasing numerical order, the train of Raw Data signals, as indicated in scan 6/A of the Table, is unchanged from that found in a scan of the board illustrated in FIG. 2. If, for example, the contactor 32 (FIG. 1) is at circuit node 6 all lower order nodes 0 through 5 are interconnected and the apparatus does not distinguish whether wire 24 is connected to pin 1 or pin 2. The end result is that the binary word in the shift register at the end of the scan sequence is the same as it is for the acceptable board of FIG. 2, and the apparatus does not distinguish the good board from the bad board.

One way of distinguishing a double circuit fault is to reverse the order of scan starting at the highest numerical pin and scanning in lower numerical order with the lower order interconnected circuit nodes actually being higher numerical value pins on the board. The data obtained from such a reverse scan of the boards of FIGS. 2 and 6 are set forth as 2/B and 6/B in the Table, and because of the nature of the particular double fault illustrated, both of these scans yield an octal number 13. Thus, although in most instances a reverse scan will detect double faults, there is still a possibility that in a special circumstance as illustrated in the board of FIG. 6, a double fault may still not be detected. In actual practice, however, the possibility of a double fault not being identified in a forward scan followed by a reverse scan is very low, and such a pair of scans will detect almost all potential faults.

In order to detect a double fault that does not show up in a forward scan and a reverse scan, a third type of scan can be employed, such as that set forth in scans 2/C and 6/C in the Table. In this instance, the scan sequence commences in the first column of pins 0, 5, 10, 15, then proceeds down the second column 1, 6, 11, 16 and so one across the board (such a column by column scan pattern is particularly well suited to crossbar switching). The scan as set forth at 2/C scanning down each column successively on the circuit board illustrated in FIG. 2 results in a six bit word in the shift register equivalent to an octal number 37. When the same scan is conducted on the circuit board illustrated in FIG. 6 having a double fault, the sequence of Raw Data set forth in scan 6/C in the Table results with three differences appearing in the Raw Data as indicated by the underlined bits. The result is a final binary word in the register having an octal equivalent of 72, different from the 37 found in the scan of the board illustrated in FIG. 2. Thus, although certain double faults can go undetected with certain orders of scan, there is some order of scan of the board that will always disclose the faults. Although the probability of a double fault being undetected is low when two scans are conducted with different scan sequences, it may be desirable in some circumstances to conduct three or more scans with different scan sequences so that plural faults on a board can be detected at a stage prior to installation of components. Because of the very short time required in order to make a single scan of a board, even though it has several thousand pins, there is no significant difficulty in conducting a series of scans of different sequences in order to assure that a board is satisfactory. With a technique as provided in practice of this invention wherein all lower order nodes are electrically interconnected, several scans can be conducted in a much shorter time than a single scan by any prior technique.

FIG. 7 illustrates a printed circuit board having circuits thereon wired in substantially the same manner as the board illustrated in FIG. 2; however, a double fault is present on the board illustrated in FIG. 7. Thus, wire 23 interconnecting pins 0 and 10 is also shorted to pin 15. The other fault on this board is in wire 26 which is not connected to pin 9, as it should be, yielding an open circuit. Assuming a forward scan of this board in order of increasing numerical value of the pins, a sequence of data as set forth in scan 7/A is produced. In this scan, the raw data is different from that of the similar scan 2/A for the board illustrated in FIG. 2 at the underlined Raw Data points in the Table corresponding to circuit node 9 and circuit node 15. Because these two differences are six nodes apart and the data is summarized in a cyclic shift register having six bits, the two faults exactly compensate. It is of no significance that one fault is a short circuit and the other is an open circuit. It is only of significance that the two faults are spaced apart in the scan pattern the length of the shift register or some multiple thereof. It will be noted that the final six bit word in the register input for this scan has an octal number equivalent of 02, exactly the same as the octal number for the satisfactory board illustrated in FIG. 2.

If the length of the shift register is n bits and two faults occur, which are n or multiple of n apart in the scan sequence, then the pair of faults will not be detected. This situation could be detected by an order of scan different from the reverse, for example, a row by row scan. It should be noted that with a six bit register, the probability of a pair of faults compensating is higher than if a longer shift register is employed. In an actual apparatus as distinguished from the exemplary embodiment illustrated, the cyclic shift register is preferably 15, 18, or 21 bits long. Multiples of three are preferred only to provide convenience in octal coding of manual input switches.

The two faults spaced apart by the length of the shift register are also detected if the length of the register is different. Thus, for example, if instead of recycling the sixth bit of a six bit shift register, the fifth bit is recycled, the cyclic register is in effect five bits long. When the circuit board illustrated in FIG. 2 is scanned with a five bit register, a sequence of binary bits as set forth in scan 2/D of the Table is produced, and the final six bit word in the register has an octal equivalent of 26. The Raw Data input is unchanged. When the board illustrated in FIG. 7 is scanned with the data recorded in a five bit cyclic shift register, a sequence of data as set forth in scan 7/B in the Table is produced. In this case, the Raw Data has two differences from the Raw Data of the scan of the acceptable board illustrated in FIG. 2, but these two differences no longer compensate and there is a final word in the six bit shift register having an octal equivalent of 47, different from the octal number 26 of the good board of FIG. 2.

Rather than employ two scans with cyclic shift registers of different lengths, the data can be applied simultaneously to two shift registers of different length, such as, for example, one of five bits and one of six bits. The only time double faults could compensate would then be in a situation where they were spaced apart in a scan sequence by a distance equal to the product of the lengths of the two registers.

A somewhat similar effect can be achieved with a single shift register in an arrangement as illustrated in FIG. 8. As illustrated in this embodiment, which comprises a cyclic shift register which can be readily substituted for the shift register in the embodiment of FIG. 1, raw data such as from the analysis logic 42 of FIG. 1 is applied to an exclusive NOR gate 66. The output of the NOR gate 66 is applied as an input to a six bit shift register 67. The sixth bit of the shift register 67 is applied as one input to an exclusive NOR gate 68, and the contents of the fifth bit of the shift register is applied as the other input to the NOR gate. The output of the exclusive NOR gate 68 is cycled back to the input of the initial exclusive NOR gate 66. In this manner, the output of the exclusive NOR gate 68 is a composite of the data accumulated in the fifth and sixth bits, and this data is recycled to the input exclusive NOR gate 66 for combination with the raw data.

Although this arrangement increases the number of possibilities of compensating faults (e.g., adjacent faults can compensate), it also effectively increases the length of the shift register at a faster rate, thereby reducing the overall probability of a pair of faults going undetected. The probability can be further lowered by additional recycling of, for example, the fourth and sixth bits of the shift register through an exclusive NOR gate connected serially with the exclusive NOR gate 68. Many other similar arrangements can be devised by one skilled in the art.

It should be noted in application of the described technique according to the illustrated embodiment, that the presence or absence of faults in the circuit board is detected. The preferred arrangement does not provide an identification of the location or nature of the fault. This is due to the reduction in word length by the cyclic shift register in order to provide convenience in data input by manual switches. If it is desired to identify the approximate location of a fault on a circuit board, a shift register having at least as many bits as there are circuit nodes on the board can be employed, and the location of the data bit having a difference from an acceptable board can be identified. If this does not exactly pinpoint the fault, it at least significantly reduces the possible places for the fault to exist and manual techniques or other automatic techniques can be used thereafter.

In the illustrative embodiment, a manual input arrangement is set forth wherein the octal number representative of the data in the shift register is known for an acceptable circuit board. The octal number can be found readily by scanning a board known to be acceptable in the desired scan pattern or patterns. In this way, very complex circuit configurations can be checked out without preparing lengthy computer programs to work out the desired circuit arrangement. Complex circuit arrangements can be verified without searching for members of each circuit string, which vastly reduces the time required for a complete circuit checkout. It is also apparent that the manual input can be dispensed with, and a scan of the acceptable board in the same pattern can be employed directly as the data input to the comparator.

The described method and apparatus is valuable in that it virtually eliminates the need for storing large masses of information which describe separate wire lists for the large variety of circuit boards and wired panels employed in electronic apparatus. Instead, a relatively few check digits in the form of numbers only a few bits long for each type circuit board provides a reasonable probability of detecting those short circuits or open circuits which would make one circuit board connection pattern different from a previously tested acceptable unit or design. This apparatus and method makes it practical to test 100 percent of a large number of printed circuit boards or wired boards before active components are mounted and soldered. Prior art testers are expensive and take too long to select from a memory the proper testing pattern and run the test for all possible circuit combinations. As a result, it has been the practice to test only connections to the edge tabs of a board and components have often been assembled on defective boards with scrapping or rework of the boards being required when functional tests are performed. With the described method and apparatus, the boards can be completely checked before any components are mounted thereon, thereby yielding substantial economies in manufacturing costs.

Although limited embodiments of apparatus constructed according to principles of this invention has been described and illustrated herein, many modifications and variations will be apparent to one skilled in the art. Thus, for example, the analysis and rejection control logic can be substantially different from that illustrated in the exemplary embodiment and other means for forming a composite of data of limited word length can be provided.

Although in the preferred embodiment, as the step switch scans along the circuit nodes successively all lower order circuit nodes are interconnected, it will be appreciated that the reverse can be employed equally well, it being only a matter of nomenclature as to what is considered a lower order node. Thus, as the scan starts all lower order nodes can be interconnected, and as the scan proceeds sequentially along the circuit nodes the lower order nodes are successively disconnected. It will therefore be understood that lower order nodes and lowest order node are merely convenient nomenclature and higher order and highest order could equally well be employed. Many other modifications and variations will be apparent and it is, therefore, to be understood that within the scope of the appended claims the invention may be practiced otherwise than as specifically described.

What is claimed is:

1. In a circuit testing apparatus for testing a circuit arrangement having a plurality of circuit nodes comprising means for applying a test signal to a circuit node, means for electrically interconnecting all circuit nodes of lower order than the circuit node to which the signal is applied at each instant, means for sensing the presence or absence of the test signal on the interconnected nodes, and means for storing indicia of said presence or absence, an improved scanning cycle means comprising:

means for applying the test signal successively without interruption to each circuit node of the plurality of circuit nodes regardless of the presence or absence of the test signal on the interconnected nodes.

2. Circuit testing apparatus for testing a circuit arrangement having a plurality of circuit nodes comprising:

means for applying a forcing voltage to each circuit node successively without interruption;
means for electrically interconnecting all circuit nodes of lower order than the circuit node to which the voltage is applied at each instant;
voltage sensing means for sensing the presence or absence of a conductive path between the test circuit node and the interconnected circuit nodes having a greater conductivity than a preselected value;
current sensing means for sensing the presence or absence of a current path between the test circuit node and the interconnected circuit nodes having a conductivity greater than a preselected value; and
means for generating a rejection signal if both the voltage sensing means and current sensing means indicate a conductive path inside or outside of acceptable limits and for generating an acceptance signal if only one of either the voltage sensing means or current sensing means indicates a conductive path within acceptable limits.

3. A circuit testing apparatus as defined in claim 2 further comprising:

means for producing a first logical signal representative of a conductive path between the test circuit node and the interconnected circuit nodes and a second logical signal representative of absence of a conductive path therebetween;
a cyclic shift register connected to the means for producing logical signals for generating a number at the end of a testing sequence wherein all circuit nodes are successively tested, the number having fewer bits than the number of circuit nodes tested;
means for inserting into the apparatus a number representative of a circuit having selected interconnections; and
means for comparing the inserted number with the number recorded in the shift register at the end of a testing sequence and for producing a comparison signal indicative of identity or lack of identity of the numbers.

4. A circuit testing apparatus as defined in claim 3 further comprising:

means for generating a rejection signal if both the voltage sensing means and current sensing means indicate a conductive path inside or outside of acceptable limits, and for generating an acceptance signal if only one of either the voltage sensing means or current sensing means indicates a conductive path within acceptable limits; and
means for combining the rejection signal and acceptance signal with the comparison signal for accepting or rejecting a circuit.

5. A circuit testing apparatus as defined in Claim 4 wherein the means for applying a test signal to each circuit node successively comprises a step switch; and wherein the means for electrically interconnecting all circuit nodes of lower order comprises a step latch switch.

6. Circuit testing apparatus for testing a circuit arrangement having a plurality of circuit nodes comprising:

means for applying a test signal to each circuit node successively without interruption;
means for electrically interconnecting all circuit nodes of lower order than the circuit node to which the signal is applied at each instant;
means for generating a first logical signal representative of a closed circuit between the circuit node being tested and the interconnected lower order circuit nodes and a second logical signal representative of an open circuit therebetween; and means for comparing a logical word formed of a sequence of first and second logical signals produced by the means for generating with a second logical word representative of a circuit having selected interconnections.

7. A circuit testing apparatus as defined in claim 6 further comprising:
means for reducing the sequence of signals to a number having fewer bits than the number of circuit nodes tested.

8. Circuit testing apparatus for testing a circuit having a plurality of nodes comprising:
means for selectively interconnecting circuit nodes for dividing a plurality of circuit nodes into a first set of externally connected nodes and a second set of externally non-connected nodes;
means for generating a test signal;
means for applying the test signal to each circuit node in the second set successively without interruption over substantially the entire plurality of circuit nodes and in coordination therewith increasing by one the number of nodes in one set and decreasing by one the nodes in the other set;
means for sensing the presence of absence of the signal on the first set of externally connected nodes; and
means for generating a signal indicative thereof.

9. Circuit testing apparatus as defined in claim 8 wherein the means for successively scanning comprises means for transferring the node just tested from the second set to the first set until all nodes except a final test node are interconnected.

10. Circuit testing apparatus as defined in claim 9 wherein the means for sensing a signal comprises:
a voltage sensor for sensing the presence or absence of a voltage of selected magnitude between the test node and the first set of externally connected nodes; and
a current sensor for sensing the presence or absence of a current of selected magnitude between the test node and the first set of externally connected nodes.

11. Circuit testing apparatus as defined in claim 8 further comprising:
means for temporarily recording a history of the signals sensed on the first set as a number;
means for generating a number representative of an acceptable circuit; and
means for comparing the recorded number with the generated number.

12. A circuit testing apparatus as defined in claim 11 wherein the means for temporarily recording comprises a cyclic shift register connected to the means for sensing.

13. A method of testing a circuit having a plurality of circuit nodes comprising the steps of:
applying a signal to a first circuit node;
interconnecting a plurality of other circuit nodes;
sensing the presence or absence of the signal on the interconnected nodes;
interconnecting the first circuit node with the previously interconnected circuit nodes;
applying a signal to a second circuit node;
sensing the presence or absence of the signal on the new set of interconnected nodes; and
sequentially repeating the interconnecting of circuit nodes and applying of signals over the entire plurality of circuit nodes without interruption regardless of presence or absence of the signal on the interconnected nodes.

14. A method of testing a circuit as defined in claim 13 further comprising:
recording a historical sequence of signals sensed on the interconnected nodes; and
comparing the recorded signals with a plurality of signals representative of an acceptable circuit.

15. A method of testing a circuit as defined in claim 14 wherein the recording step further comprises reducing the sequence of signals to a number having fewer bits than the number of circuit nodes tested.

16. A method of testing as defined in claim 13 comprising the step of:
repeating the interconnecting of circuit nodes, applying of signals, and sensing the presence or absence of the signal over substantially the entire plurality of circuit nodes in a scan sequence different from the first sequence of interconnecting and applying.

17. A method of testing a circuit having a plurality of circuit nodes comprising the steps of:
sequentially sensing the presence or absence of electrical continuity between each successive circuit node and all circuit nodes of lower order than the first circuit node for distinguishing all lowest order circuit nodes in each continuous circuit from all other circuit nodes; and
comparing the location of lowest order circuit nodes so distinguished with desired locations of lowest order circuit nodes without searching for members of each circuit string.

18. Circuit testing apparatus for a circuit board having a plurality of circuit nodes comprising:
means for distinguishing all lowest order circuit nodes in each continuous circuit from all other circuit nodes; and
means for comparing the locations of lowest order circuit nodes so distinguished with desired locations of lowest order circuit nodes without searching for members of each circuit string; and wherein the means for identifying all lowest order nodes comprises means for sequentially sensing the presence or absence of electrical continuity between each successive circuit node and all circuit nodes of lower order than each successive circuit node respectively.

19. A circuit testing apparatus for testing a circuit arrangement having a plurality of circuit nodes comprising:
scanning cycle means for applying a test signal successively without interruption to each circuit node of the plurality of circuit nodes;
means for electrically interconnecting all circuit nodes of lower order than the circuit node to which the signal is applied at each instant; and
sensor means for sensing the presence or absence of the test signal on the lower order nodes.

20. A method of testing the acceptability of a circuit arrangement having a plurality of circuit nodes comprising the steps of:
selecting an arbitrary ordered sequence for all of the circuit nodes;
applying a test signal to one of the circuit nodes;
electrically interconnecting all circuit nodes of lower order than the circuit node to which the signal is applied at each instant;

sensing the presence or absence of the test signal on the interconnected nodes; and applying the test signal successively without interruption to each circuit node in the sequence of circuit nodes.

21. A method as defined in claim 20 comprising the additional steps of:

selecting a second arbitrary ordered sequence for all of the circuit nodes different from the first ordered sequence; and repeating the steps of applying, interconnecting, and sensing successively with respect to each circuit node in the second sequence of circuit nodes.

22. A method as defined in claim 21 wherein the second sequence is the reverse of the first sequence.

23. In a method for testing a circuit arrangement having a plurality of circuit nodes including the steps of sensing the presence or absence of a test signal between one circuit node and interconnected circuit nodes of lower order than the one circuit node, and generating a comparison signal indicative of the presence or absence, the improvement comprising:

successively sensing the presence or absence of the test signal between each circuit node and its corresponding interconnected lower order nodes over at least two sequences of circuit nodes that are different from each other.

24. In a method for testing as defined in claim 23 the further improvement wherein one of the sequences is the reverse of the other sequence.

* * * * *